E. E. PROULX.
VALVE MECHANISM FOR INTERNAL COMBUSTION ENGINES.
APPLICATION FILED MAY 5, 1913.
1,112,933.
Patented Oct. 6, 1914.
2 SHEETS—SHEET 1.
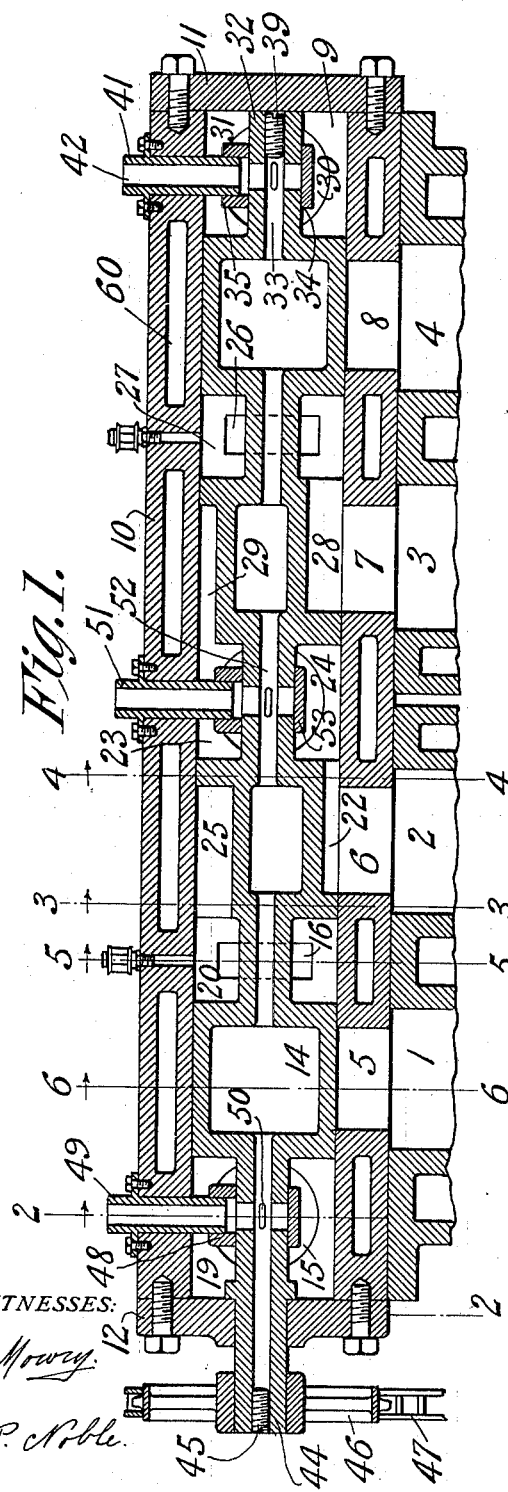
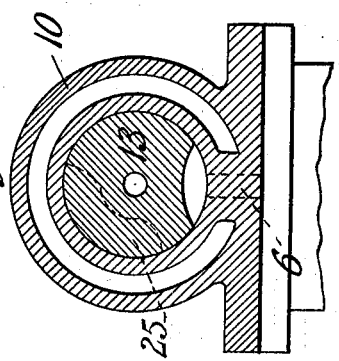
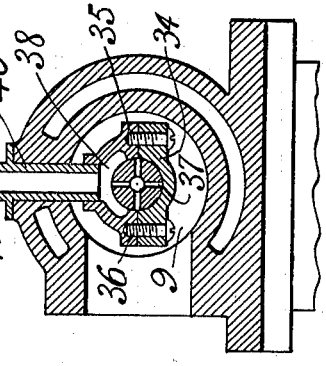
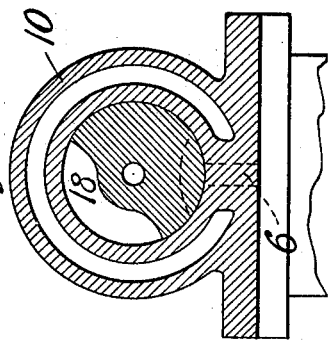
WITNESSES:
R. M. Mowry.
W. P. Noble.
INVENTOR.
Ernest E. Proulx,
BY
ATTORNEY.
THE NORRIS PETERS CO., PHOTO-LITHO., WASHINGTON, D. C.

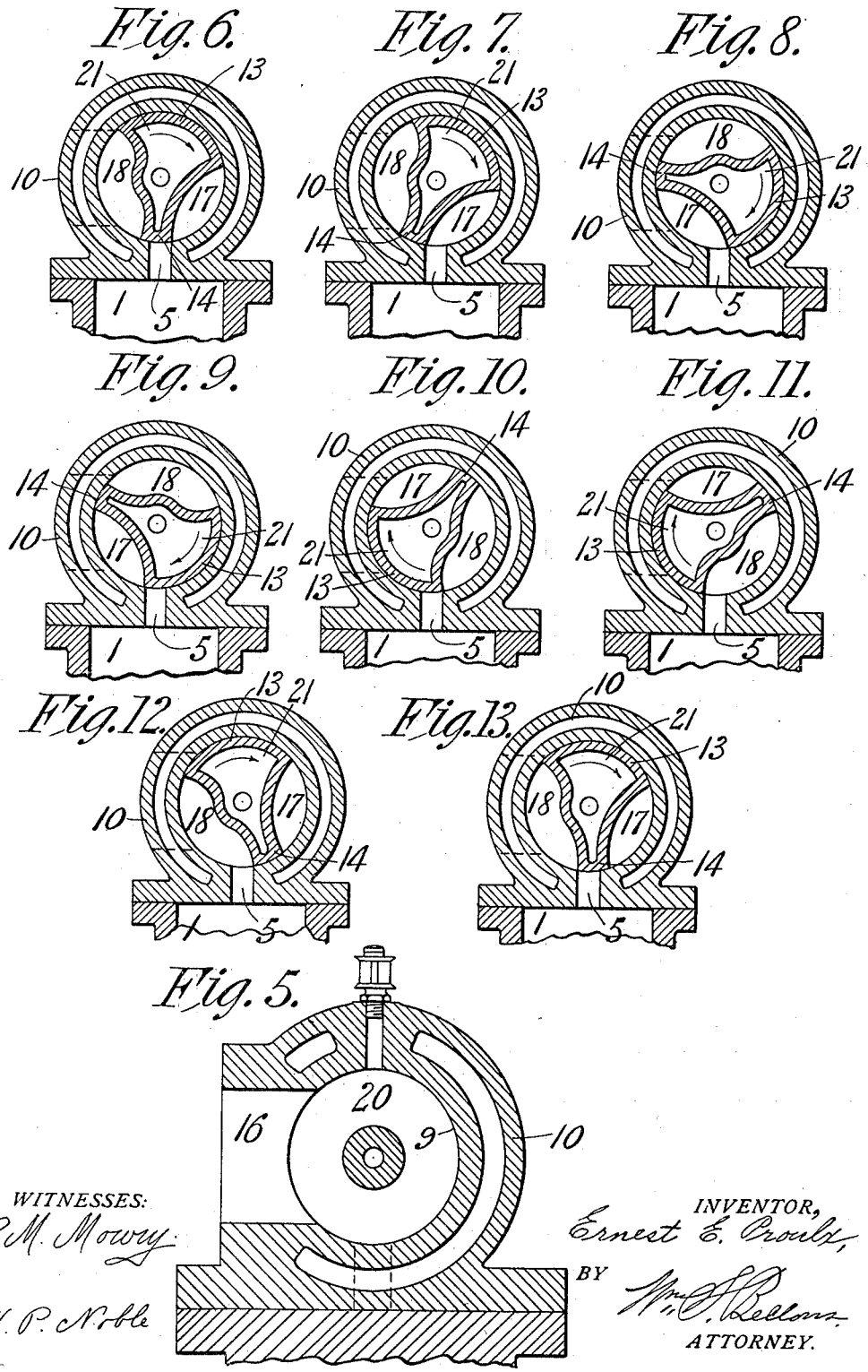

UNITED STATES PATENT OFFICE.

ERNEST E. PROULX, OF WILLIMANSETT, MASSACHUSETTS.

VALVE MECHANISM FOR INTERNAL-COMBUSTION ENGINES.

1,112,933.  Specification of Letters Patent.  Patented Oct. 6, 1914.

Application filed May 5, 1913. Serial No. 765,532.

*To all whom it may concern:*

Be it known that I, ERNEST E. PROULX, a citizen of the United States of America, and resident of Willimansett, in the county of Hampden and State of Massachusetts, have invented certain new and useful Improvements in Valve Mechanisms for Internal-Combustion Engines, of which the following is a full, clear, and exact description.

This invention has for its object to provide an improved form of rotary valve device for internal combustion engines or motors; which is provided with a rotary valve with ports in the form of channels in the periphery of the valves, and in one form of which the channel has an annular extension to constantly register with a port in the casing for the valve.

Another object of the invention is to provide a form of rotary valve member, and specially one of the type mentioned, that is provided with a chamber extending substantially throughout the length of the member, and closed to the said channels in the periphery of the member; which chamber has its extremities connected respectively with an inlet and an outlet for a cooling fluid, that passes through the exhaust channels of the engine and is in constant communication for a continuous flow of the cooling fluid during the rotation of the valve.

A further object of the invention is to provide the chambered rotary valve member as above set forth, that rotates in a valve casing provided with exhaust ports, with outlet and inlet connections for the said chambered valve that pass through the exhaust ports or channels in the valve member in proximity to the exhaust ports of the casing; and which connections are preferably provided with adjustable packing or tightening means; so that any leakage of the cooling water would take place in the exhaust passage, and simply pass off with the exhaust gases, without in any way interfering with the normal action of the motor.

In the accompanying drawings representing one embodiment of my invention, Figure 1 shows in vertical longitudinal sections portions of four cylinders that connect with a valve chest carrying a rotary valve member. Fig. 2 is a cross section on the line 2—2 of Fig. 1. Fig. 3 is a cross section on the line 3—3 of Fig. 1. Fig. 4 is a cross section on the line 4—4 of Fig. 1. Fig. 5 is a cross section on the line 5—5 of Fig. 1. Fig. 6 is a cross section on the line 6—6 of Fig. 1. Figs. 7 to 13 are views identical with Fig. 6, but showing the valve advanced in successive positions for a complete revolution.

In Fig. 1 is set forth the upper portion of what might be termed a four cylinder motor of the *en-bloc* type, there being shown the four cylinders, number 1, 2, 3 and 4 respectively with a single port for each, designated by 5, 6, 7 and 8 that lead to the bore 9 of a valve casing denoted generally by 10, having closed ends 11 and 12. In the bore 9 of the casing rotates a rotary valve member denoted generally by 13, of cylindrical, or more particularly tubular form; the cylindrical valve serving to close the four said ports 5, 6, 7 and 8, by its periphery.

The valve casing 10 is provided with one or more exhaust ports, and with one or more inlet ports leading to its bore, and which ports are covered by the periphery of the rotary valve member.

Taking up now the valve arrangement for the first cylinder 1 having its gas port 5, it will be seen from Fig. 1 that this port 5 is closed by being covered by the periphery of the valve member 13; which port 5 is indicated in Fig. 6 as closed by the cylindrical wall portion 14 of the valve. The casing 10 is shown provided with an exhaust port 15 at one side of the cylinder port 5 and out of alinement therewith longitudinally of the casing bore; and the casing is further provided with an inlet port 16 located on the opposite side from the port 5, and also out of alinement with the cylinder port; being shown alining with the exhaust port 15.

On one side of the valve wall 14 is provided a channel 17 in the periphery of the valve member, whose ends are closed by transverse walls, and extends longitudinally along the periphery of the valve so that during the rotation of the valve member at a certain stage will connect the cylinder port 5 with the inlet port 16; which will take place when the valve turns from the position indicated in Fig. 6 to that in Fig. 7. The valve member on the opposite side of the valve wall 14 is provided with a channel 18 extending approximately about one third of the circumference of the valve member, and of a length to register with the cylinder port 5 and also with the exhaust port 15 in the casing; the portion of the channel 18 is made annular at 19 to continuously register with the exhaust port 15, but it will be seen that this annular portion is beyond the port 5 of the cylinder, so that the cylinder can only connect with the exhaust port when the portion 18 registers with the port 5. Similarly, the said channel 17 is provided with an annular portion 20 that constantly communicates with the inlet port 16, but which does not register with the cylinder port 5. Therefore it follows that whenever the channels 17 or 18, register with the port 5 of the cylinder, the latter will be connected with the inlet, or with the exhaust by one of these channels.

Referring now to Figs. 6–13, in Fig. 6 it will be seen that port 5 is closed by the cylinder wall 14 and consequently there is neither admission nor exhaust to the cylinder 1; the valve turning in the direction indicated by the arrow to the position of Fig. 7, uncovers port 5 by channel 17, at once upon the valve shifting from the position of Fig. 6, and in Fig. 7 the port 5 is fully open; and the port 5 will remain fully open to the inlet from the position of Fig. 7 to that indicated in Fig. 8. From the position of Fig. 8 to that of Fig. 9 of the valve, it will be understood that the port 5 will be closing, being shut off at the latter position by the cylinder wall portion 21.

From the position of Fig. 9 of the valve to that shown in Fig. 10 the port 5 will remain closed by reason of the cylindrical wall portion 21 of the valve. The valve moving from the position of Fig. 10 to that of Fig. 11 will bring the exhaust port 18 or channel portion of the valve to register with the cylinder port 5, in the latter position the port being fully open; and it will be understood that the channel 18 will continue to uncover the port 5 to the exhaust as the valve travels to the position of Fig. 12. From the latter position to that of the position shown in Fig. 13, the narrow wall portion 14 of the valve is brought to cover the port 5, and the valve has now made one complete revolution; during one portion of which the inlet is connected with the cylinder port 5; during another portion of which the exhaust is brought into communication with the cylinder port 5, and during another portion or stage of the revolution of the valve, and for a considerable period, the cylinder port 5 is entirely closed; which is for the purpose of providing ample time for the compression of the charge in the cylinder and its ignition, and the resulting power portion of the stroke of the piston in the cylinder.

The construction and operation of the parts as far as have been described, would suffice for a single cylinder motor. Where a pair of cylinders are employed in the same engine, by my construction it is only necessary to have one additional port in the casing, and two additional channels in the valve member; either an additional exhaust port is provided in the casing, or else an additional inlet port. For the next cylinder 2 having the single port 6, the casing 13 is provided with a channel 22 in its periphery similar to the said channel 17, to register with the port 6 during a portion only of the valve rotation; the channel 22 connecting with an annular channel 23 extending around the valve and consequently communicating with the second exhaust port 24 in the valve casing 10, corresponding to the said annular portion 19 of the exhaust passage for the cylinder port 5. A second channel 25 is provided in the periphery of the valve member 13, being positioned relative to the channel 22, similar to the inlet passage 17 of the valve member; and which passage 25 or channel connects with the described annular passage 20 in the valve member. Of course these four channels in the periphery of the valve member will be disposed in pairs relative to each other to provide the desired timing or sequence of admission and exhaust of the two cylinders 1 and 2 through their ports 5 and 6.

Where a third cylinder is provided, such as the cylinder 3 provided with the single port 7, it is only necessary to provide one additional port in the casing, either inlet or exhaust; and as shown a second inlet port 26 is provided in the valve casing.

The valve member 13 is provided with an annular channel or passage 27 constantly registering with the inlet port 26, and which passage connects with a channel 28 in the periphery of the valve member, corresponding in position to the said inlet channel 17 of the valves, whereby to register with the port 7 of the cylinder 3 at a certain stage in the revolution of the valve; that will provide admission for the charge to the cylinder 3 from the inlet port 26. This port 7 of the cylinder 3, at another stage in the revolution, registers with a channel 29 similar in position to the described exhaust channel 18, and which is extended to communicate with the said annular exhaust passage 23 of the valve member.

It will thus be obvious that for three cylinders in a motor, with my construction and arrangement it is only necessary to provide two exhaust ports in the casing and two inlet ports in the casing; together with a single port for each of the three cylinders.

To accommodate the fourth cylinder 4 having the single port 8, I simply provide one additional port in the casing, such as an exhaust port 30; and at this portion the valve 13 has an annular channel or passage 31 constantly communicating with the exhaust 30, the channel extending to the extremity of the valve member and being closed by the end wall 11 of the casing. This channel 31 connects with a channel in the casing identical in construction and similar in arrangement to the channel 22 that connects with the exhaust chamber 23, which is not shown in the drawing, but which it will be understood will register at a certain stage with the cylinder port 8 to provide exit for the gases in the cylinder 4.

The described annular inlet passage 27 is provided with a connection in the form of a channel, not shown but identical in construction and similar in location to the channel 25 that connects with the annular channel 20; and which said channel will at a period in the revolution of the valve register with the port 8 of the cylinder 4 to connect the inlet 26 with the port 8. It will be understood that these two channels that alternately register with the port 8, correspond in arrangement and operation with the described channels 17 and 18, but which are relatively disposed around the circumference of the valve to produce the desired timing effect. And it will be further understood that in regard to the four cylinders and their sets of registering channels, that all of these channels are relatively displaced in the rotation of the valve member to cause the four cylinders to act in the desired sequence.

The second feature of my invention resides in the construction of a rotary valve member provided with channels or passages in its periphery, whereby a circulation of a cooling fluid such as water, can be caused to constantly flow through the valve member, that for this purpose is made chambered; and is shown as substantially tubular throughout its entire structure, that is, the valve member is cored from one end to the other. Where the valve member is cylindrical or has a continuous circular section, the valve member has a cylindrical bore; and where channels are provided in the periphery, the inner walls or bottom portions of the channels are simply comparatively thin walls, thereby providing a continuous bore or chamber at the interior of the valve member.

Means are provided at each extremity of the valve member for connecting the respective ends of this chamber with a suitable inlet, and with an outlet for the water; and such inlet and outlet are preferably arranged to occupy part of the passage for the exhaust gases, so that should any leakage occur between the inlet and outlet member that is stationary and the connection with the valve that rotates, such leakage will be received in the exhaust gases and be thereby carried away with the exhaust, probably as steam.

At the end portion of the valve casing closed by the disk 11, the valve 13 is provided with the annular passage 31 as described, forming a reduced tubular portion 32 that is shown extending to the end wall 11, and provided with a bore 33 at its axis. This tube is surrounded by a split sleeve constructed similar to a journal bearing, divided on an axial section into two portions 34 and 35 clamped together by screw bolts 36 to form a tight bearing around the tubular stem. And the latter is provided with one or a series of ports 37, four being shown that alternately connect the bore 33 of the valve with a chambered portion 38 of the sleeve, the outer extremity of the bore 33 being suitably closed, as by a screw plug 39 beyond the ports 37. The said split sleeve has an opening leading to the passage 38, and opposite the same in a valve casing is a bore 40 registering therewith, the bore 40 receiving an inlet or outlet pipe 41, whose bore 42 it will be seen from Fig. 2, communicates with the chamber 38, and thereby through the ports 37 is in connection with the chamber or bore of the valve member. It will be understood that the pipe 41 being secured to the sleeve member will prevent the latter from rotating with the valve and hold it stationary; but one, or usually two of the four ports 37 always serve to connect the bore of the valve member with this outlet passage. The screw bolts 36 serve to properly adjust this split sleeve, that is in the nature of a packing, and leakage of the cooling water between the rotating valve tube 32 and the stationary sleeve can be prevented or reduced to a minimum. And since the sleeve is located in the exhaust annular passage 31, any leakage of water at this place will be simply carried away with the exhaust gas.

At the opposite end of the valve casing closed by the disk 12, a substantially identical arrangement is employed. The valve member provided with the annular passage 19 at this end, is in the form of a reduced tube 44, shown as extending through a hole in the disk 12 and closed at its outer end by a plug 45. This extension 44 of the valve may be provided with a sprocket 46 for driving the valve by a chain 47, or other means, from any suitable part of the engine and at the proper speed.

The tube 44 is shown provided with a split sleeve 48 similar to that described and shown at the other end of the casing, which sleeve connects with an inlet tube 49 passing through the valve casing. It will be understood that the water for cooling can pass in through the tube 49 to the split sleeve, and can flow into the bore of the valve through the radial openings 50; from thence the water must pass through the more or less irregular chambered portions of the valve as shown until it reaches the other end portion of the valve, when it will enter the bore 33, and pass through the split sleeve and find exit through the outlet pipe 42; and the bore of the valve is thus in constant communication with these inlet and outlet members during the rotation of the valve members so that a continuous flow of the water can be insured.

If preferred an inlet, or outlet, arrangement for the cooling water can be provided in all of the exhaust passages, and a third connection of this sort is shown at the intermediate exhaust valve passage 21, in the form of a pipe 51 leading to the bore 52 of the valve at this portion, through a split sleeve 53 similar to those that have been described. This pipe 51 may if desired be used for the inlet of the water, and the other two pipes 49 and 42 be employed for the outlet, so that the water will pass in both directions from the middle portion to each end of the valve. Obviously the intermediate pipe 51 could constitute an outlet and the two similar end pipes could be the inlet pipes for the water.

The casing member 10 can have its walls provided with chambers 60 for cooling purposes as usual in this art.

What I claim is:

1. The combination of a casing provided with a cylinder port, the casing having an inlet port located to one side of said port and out of alinement therewith longitudinally of the casing, the casing having another port located on the opposite side of the said cylinder port and also out of alinement therewith longitudinally of the casing, a cylindrical valve member rotatable in the casing to cover said inlet and exhaust ports and provided with a channel in the periphery arranged to connect the cylinder port with the said inlet port at a certain stage in the revolution of the valve, said channel having a portion extending around the valve member to constantly register with the inlet port, the valve having another channel in its periphery arranged to connect the said cylinder port with said exhaust port at another stage in the revolution of the valve and when the other channel is beyond said port-registering position, said latter channel having a portion extending around the valve member to constantly register with the exhaust port.

2. The combination of a casing provided with a cylinder port, the casing having an inlet port located to one side of said port, the casing having another port located on the opposite side of said cylinder port, a cylindrical valve member rotatable in the casing to cover said inlet and exhaust ports and provided with a channel in the periphery arranged to connect the cylinder port with the said inlet port at one stage in the revolution of the valve, said channel having an annular portion extending around the valve member to constantly register with the inlet port, said valve having another channel in its periphery arranged to connect with said exhaust port at said cylinder port with said exhaust port at another stage in the revolution of the valve and when the other channel is beyond said port-registering position, said latter channel having a portion extending around the valve member to constantly register with the exhaust port.

3. The combination of a casing provided with inlet and exhaust ports in its bore, a cylindrical valve member rotatable in the casing bore and provided with channels in its periphery arranged to register with said ports and put them in connection, the valve member having interior chambers closed to said channels and also to said ports of the casing, and having inlet and outlet ports the casing being provided with an inlet member and also an outlet member connecting respectively with end portions of the chamber in the casing to permit circulation of cooling fluid during the rotation of the valve member, said inlet and outlet members passing through the exhaust channels of the valve member and provided with adjustable packing means therein.

4. The combination of a casing provided with inlet and exhaust ports in its bore, a cylindrical valve member rotatable in the casing bore and provided with channels in its periphery arranged to register with said ports and put them in connection, the valve member having interior chambers closed to said channels and also to said ports of the casing and having inlet and outlet ports, the casing being provided with an inlet member and also an outlet member connecting respectively with end portions of the chamber in the casing to permit circulation of cooling fluid during the rotation of the valve member, said exhaust channels of the valve member having an annular portion extending around the valve to constantly register with the exhaust ports in the casing during rotation of the valve member, said inlet and outlet members for the cooling fluid passing through said exhaust channel portions of the valve member.

5. The combination of a casing provided with a cylinder port, the casing having an inlet port located to one side of said port and out of alinement therewith longitudinally of the casing, the casing having another port located on the opposite side of the said cylinder port and also out of alinement therewith longitudinally of the casing, a cylindrical valve member rotatable in the casing to cover said inlet and exhaust ports and provided with a channel in the periphery arranged to connect the cylinder port with the said inlet port at a certain stage in the revolution of the valve, said channel having an annular portion extending around the valve member to constantly register with the inlet port, the valve having another channel in its periphery arranged to connect the said cylinder port with said exhaust port at another stage in the revolution of the valve and when the other channel is beyond said port-registering position, said latter channel having a portion extending around the valve member to constantly register with the exhaust port, the casing being provided with an inlet member and also an outlet member passing through said exhaust channel portions of the valve member and connecting respectively with end portions of the valve in the casing to permit circulation of cooling fluid during the rotation of the valve member.

6. The combination of a casing provided with inlet and exhaust ports in its bore, a cylindrical valve member rotatable in the casing bore and provided with channels in its periphery arranged to register with said ports and put them in connection, the valve member having interior chambers closed to said channels and also to said ports of the casing, the casing being provided with an inlet member and also an outlet member connecting respectively with end portions of the chamber in the casing to permit circulation of cooling fluid during the rotation of the valve member, an axially arranged tubular extension on one end of the valve member whose extremity is closed, said extension having one or more apertures, a sleeve surrounding the apertured part of the extension that is chambered and provided with an outlet, to thereby provide communication with the valve member interior portion.

7. The combination of a casing provided with inlet and exhaust ports in its bore, a cylindrical valve member rotatable in the casing bore and provided with channels in its periphery arranged to register with said ports and put them in connection, the valve member having interior chambers closed to said channels and also to said ports of the casing, the casing being provided with an inlet member and also an outlet member connecting respectively with end portions of the chamber in the casing to permit circulation of cooling fluid during the rotation of the valve member, an axially arranged tubular extension on one end of the valve member whose extremity is closed, said extension having adjacent apertures arranged in a circular series, a split sleeve surrounding the apertured part of the extension that is chambered and provided with an outlet to thereby provide communication with the interior portion of the valve member.

Signed by me at Springfield, Mass., in presence of two subscribing witnesses.

ERNEST E. PROULX.

Witnesses:
WM. S. BELLOWS,
G. R. DRISCOLL.

Copies of this patent may be obtained for five cents each, by addressing the "Commissioner of Patents, Washington, D. C."